Nov. 29, 1927. 1,651,231
P. J. SHRUM
APPARATUS FOR FORMING THREAD PROTECTORS
Filed April 16, 1925   2 Sheets-Sheet 1
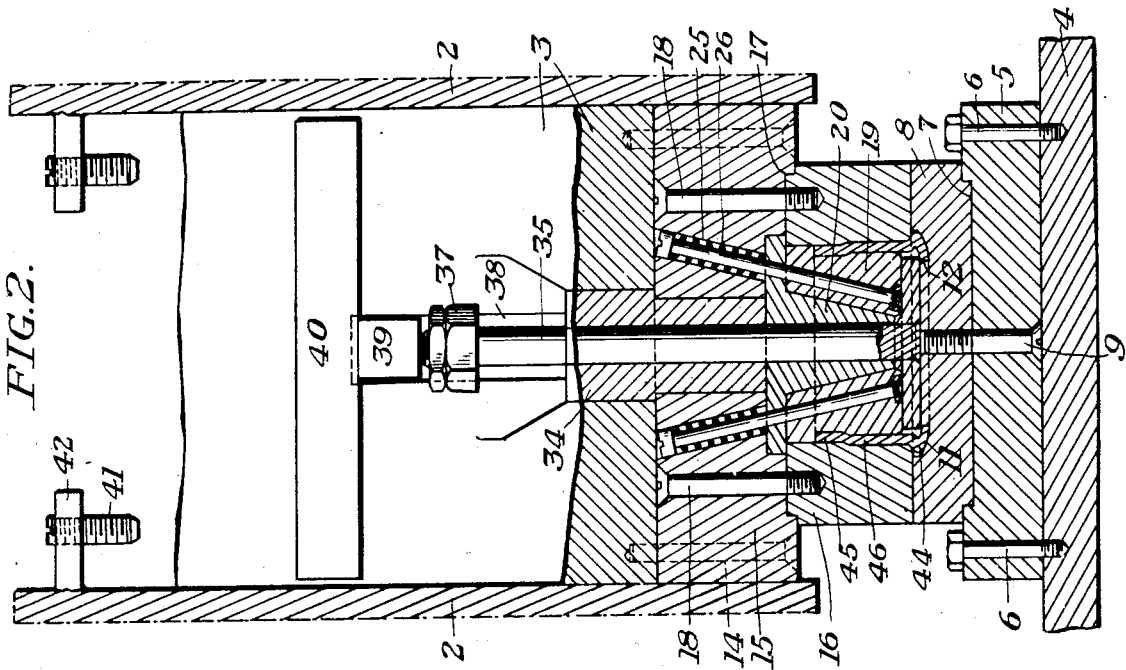
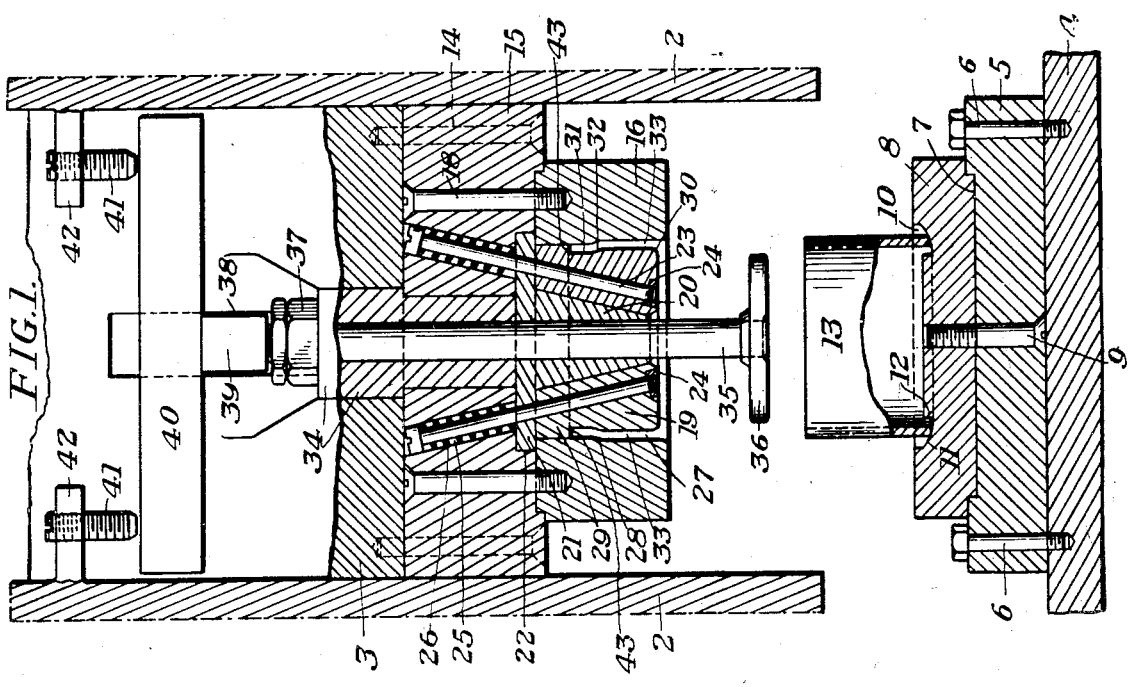

Nov. 29, 1927. 1,651,231
P. J. SHRUM
APPARATUS FOR FORMING THREAD PROTECTORS
Filed April 16, 1925  2 Sheets-Sheet 2
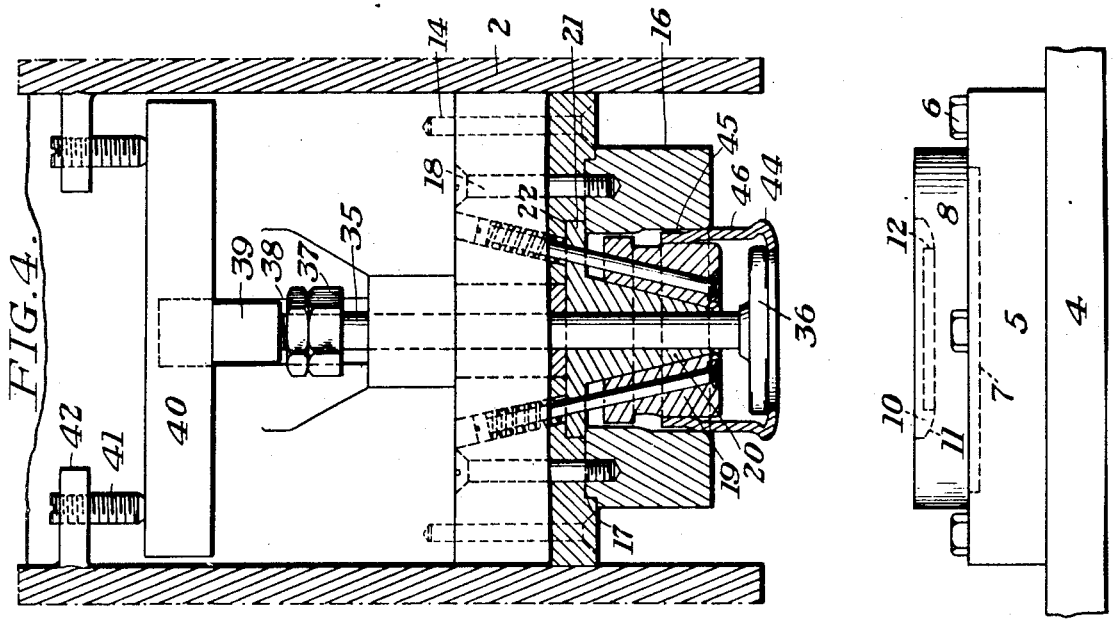
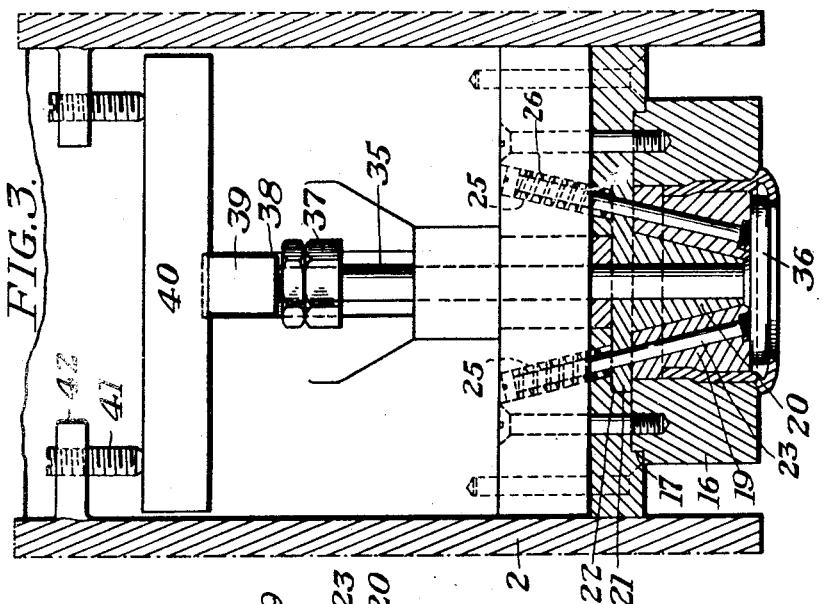
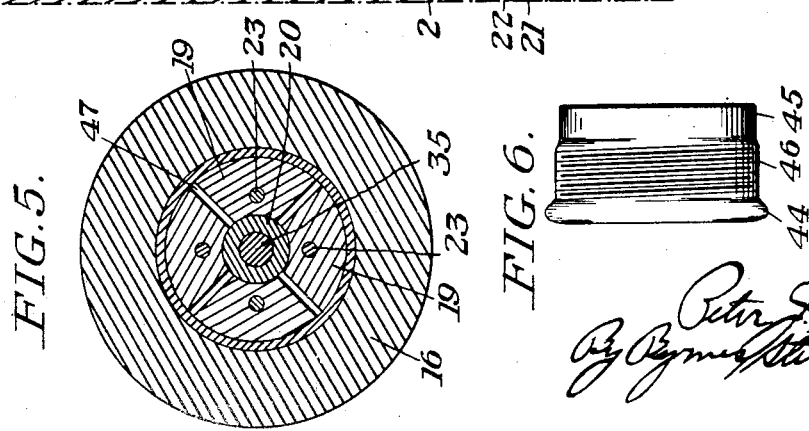
INVENTOR Patented Nov. 29, 1927.

1,651,231

UNITED STATES PATENT OFFICE.

PETER J. SHRUM, OF MONACA HEIGHTS, PENNSYLVANIA, ASSIGNOR TO COLONA MANUFACTURING COMPANY, OF PITTSBURGH, PENNSYLVANIA, A CORPORATION OF PENNSYLVANIA.

APPARATUS FOR FORMING THREAD PROTECTORS.

Application filed April 16, 1925. Serial No. 23,712.

The present invention relates to apparatus for forming thread protectors, and more particularly to apparatus for forming thread protectors for pipe couplings and internally threaded pipe, of the type for example disclosed in my copending application, Serial No. 708,204, filed April 22, 1924.

In the drawings—

Figures 1 to 4, inclusive, are similar vertical sectional views, partly in elevation, of a preferred form of apparatus embodying my invention, these views showing, respectively, different stages in the cycle of operations for forming a protector from a blank.

Figure 5 is a horizontal sectional view of the upper forming die; and

Figure 6 is an elevation of a formed and threaded protector.

Referring to the illustrated embodiment of the invention, 2 designates the frame of a power press having a vertically reciprocating plunger 3. Mounted on the bed plate 4 of the press is a die holder 5 which is removably secured thereto by screws 6. Seated in a circular recess 7 in the upper face of the die holder is the lower forming die 8 which is held in said recess by the screw 9. This die has an annular groove 10 formed in its upper surface, said groove having a downwardly and inwardly inclined annular bottom face 11 and an inner annular vertical edge wall 12.

Figure 1 shows a tubular blank 13 seated in the groove 10 with its lower edge in contact with the inclined bottom face 11 of said groove. The press plunger 3 is shown in its fully raised position. It is secured by screws 14 to the holder 15 for the upper die. This die comprises an outer ring 16 seated in an annular recess 17 in the lower face of the die holder 15 and held therein by screws 18. Within the bore of the ring 16 is a die plug formed in a plurality of segments 19, the inner concave faces of which are downwardly and inwardly inclined for cooperation with the peripheral surface of an inverted frusto-conical core member 20 having an annular flange 21 at its upper end seated in an annular recess 22 in the lower face of the die holder 15 and clamped therein by the ring 16. Bolts 23 having the same angle of inclination to the vertical as the inner concave faces of the segments 19 extend through said segments and have their lower screw-threaded ends engaged by nuts 24 positioned in recesses in the lower end faces of the segments. These bolts extend through the flange 21 into bores 25 in the die holder 15 and have their upper headed ends slotted to receive the end of a screw driver or other instrument for turning the bolts in order to engage their screw-threaded ends with or disengage them from the nuts 24. Surrounding the portions of the bolts which project into the bores 25 are coil springs 26 which co-act with the heads of the bolts to normally maintain the segments 19 with their upper end faces in engagement with the lower face of the flange 21.

The bore 27 of the ring 16 has its upper portion of slightly reduced diameter, thereby forming an upwardly and inwardly inclined annular shoulder 28 in the inner peripheral wall of the ring intermediate the enlarged and reduced portions of the bore 27. The upper end portion 29 of the die plug formed by the segments 19 fits the upper reduced portion of the bore 27 when the segments are in the normal position shown in Figure 1. The lower end portion 30 of the plug is of reduced diameter and the portion 31 thereof between the lower end portion 30 and the upper end portion 29 is of slightly smaller diameter than the lower portion 30, thereby providing an annular downwardly and outwardly inclined shoulder 32 in the outer peripheral wall of the plug intermediate the portions 30 and 31. The reduced portions 30 and 31 of the plug provide an annular channel 33 between the plug and the wall of the bore 27 of the ring 16 to receive the tubular blank 13, when the upper die is brought down on the lower die which channel has its upper end portion inwardly offset.

Reciprocable in a vertical bore extending through the core member 20 and a centering plug 34 for the die holder 15 which is carried by the press plunger is the stem 35 of a knockout disk 36. This knockout disk is mounted on the lower end of the stem 35 and is of a diameter such as to slightly overhang the inner vertical edge wall 12 of the groove 10 in the lower die 8 when the parts are in the position illustrated in Figure 2. The upper screw-threaded end of the stem 35 has a nut 37 mounted thereon for engagement with the upper end face of the plug 34 to limit downward movement of the stem and knockout disk. Reciprocable in a vertical slot 38 in the press plunger is a horizontal bar 39 which rests on the upper end of the stem 35. This bar carries a horizontal cross-bar 40 adapted to engage set screws 41 carried by brackets 42 integral with the frame 2, said set screws constituting adjustable stops or abutments.

Having described the construction of the apparatus in detail, I will now briefly describe its operation. With the apparatus in position shown in Figure 1, a tubular blank 13 is seated in the annular groove 10 of the lower forming die 8. The press plunger is then lowered and as it descends the knockout disk enters the tubular blank and engages the upper face of the lower die. During the downward movement of the plunger the blank enters the annular channel 33 in the upper die and as the plunger continues to descend the upper edge of the blank engages the shoulder 28 of the ring 16, whereby the upper end portion of the blank is forced to enter the upper inwardly offset portion of the channel 33. Before the plunger completes its downward stroke the upper edge of the blank engages the bottom 43 of the channel 33, since the channel is of less depth than the height of the tubular blank. As the plunger completes its downward stroke, bringing the parts into the position shown in Figure 2 with the upper and lower dies in contact with each other, the blank is compressed between the bottom 43 of the channel 33 and the bottom face 11 of the annular groove 10, whereby the lower end portion of the blank is bent into the form of an outwardly extending double-walled flange 44. The folded edge of this flange faces outwardly while the free edge thereof faces inwardly, the flange being forced to bend in this manner by reason of the fact that the lower face 11 of the annular groove 10 is downwardly and inwardly inclined. The vertical inner edge wall 12 of the groove acts as a stop for the free inner edge of the flange during the formation thereof, and it will be seen that when the formation of the flange is completed, as illustrated in Figure 2, the free edge of the flange 44 projects inwardly a slight distance beneath the peripheral edge portion of the knockout disk 36. The protector is also formed with an inwardly offset upper end portion 45 of a slightly smaller external diameter than the body portion 46. The latter portion of the formed blank is provided with external screw threads to form the completed protector illustrated in Figure 6.

It will be seen that when the press plunger has completed its downward stroke to bring the parts into the position shown in Figure 2, thus completing the forming operations on the blank, the cross-bar 40 has been moved away from the abutment screws 41 and the upper end face of the plug 34 has been moved away from the nut 37 on the upper end of the stem 35. When the press plunger makes its return or upward stroke the formed blank is held by friction in the channel in the upper die and is carried upward with the latter until the cross-bar 40 engages the abutment screws 41. At this point further upward movement of the knockout disk with the upper die is arrested, so that during further upward movement of the plunger the knockout disk, through its engagement with the free edge of the flange 44 of the formed blank, is effective to force the formed blank out of the upper die. The first portion of the movement of the formed blank out of the die is effective to carry the segments 19 of the die downwardly with the blank by reason of the engagement of the inwardly offset upper portion 45 of the formed blank with the shoulder 32 on the plug. Referring to Figure 5, it will be seen that when the segments 19 are in normal position there are spaces 47 between the edge faces of the segments. These spaces permit the segments to be moved downward with the blank. When the segments have moved downwardly a sufficient amount to contract the blank to such an extent that the reduced upward portion 45 of the formed blank can be slipped by the shoulder 32, as illustrated in Figure 4, further downward movement of the segments ceases, and as the plunger completes its upper stroke the formed blank is forced completely out of the upper die and falls onto the lower die. As soon as the formed blank is forced free of the upper die the springs 25 return the segments 19 to normal position and the parts are then ready for the forming of another blank.

While I have shown and described a preferred embodiment of my invention, it will be understood that the invention is not limited to its illustrated embodiment, but that it may be otherwise embodied within the scope of the appended claims without departing from the spirit of the invention.

I claim:

1. Apparatus for forming thread protectors, including upper and lower die members, one of which has a central core around which there is a relatively deep annular channel for shaping a thread protector, the other member having a shallow channel therein for forming a terminal on a thread protector, the innermost end of the deep channel being of reduced diameter, said core being collapsible to permit of the removal of the thread protector from the die member, substantially as described.

2. Apparatus for forming thread protectors, including upper and lower die members, one of which has a central core around which there is a relatively deep annular channel for shaping a thread protector, the other member having a shallow channel therein for forming a terminal on a thread protector, the innermost end of the deep channel being of reduced diameter, said core being composed of reversely tapered sections, some of which are movable longitudinally with respect to the other to effect radial expansion and contraction of the core, substantially as described.

3. Apparatus for forming thread protectors, including upper and lower die members, one of which has a central core around which there is a relatively deep annular channel for shaping a thread protector, the other member having a shallow channel therein for forming a terminal on a thread protector, the innermost end of the deep channel being of reduced diameter, said core being composed of reversely tapered sections, some of which are movable longitudinally with respect to the other to effect radial expansion and contraction of the core, and springs for holding the movable sections in a normally expanded position, substantially as described.

4. Apparatus for forming thread protectors, comprising a lower die having an annular groove in its upper face to receive the end of a tubular blank, a vertically reciprocable upper die having an annular channel adapted to receive said blank as the upper die is brought down on the lower die but of less depth than the height of said blank, the bottom portion of said channel being inwardly offset, the construction being such that when the dies are brought together with a blank seated in said groove one end portion of the blank is bent in said groove into the form of an outwardly extending double-walled annular flange, while the other end portion of the blank is offset inwardly from the body of the blank, whereby it has a slightly smaller external diameter than the body of the blank, and knockout means associated with the upper die effective upon the upward stroke of the latter to force the formed blank out of said channel, said upper die comprising a plug, the peripheral surface of which forms the inner peripheral wall of said channel, said plug being formed in segments yieldingly held in normal position within the outer portion of the die and movable downwardly and inwardly as the formed blank is forced out of the upper die to enable the inwardly offset upper end portion of the formed blank to slide over the lower end portion of the plug, substantially as described.

In testimony whereof I have hereunto set my hand.

PETER J. SHRUM.